United States Patent [19]
Forbes et al.

[11] Patent Number: 5,234,369
[45] Date of Patent: Aug. 10, 1993

[54] ANIMAL CALL, AND METHODS OF AND APPARATUS FOR MAKING SAME

[75] Inventors: David R. Forbes; Carman S. Forbes; Ron M. Bean, all of Cedar Rapids, Iowa; Curtis P. Hoegner, East Moline, Ill.

[73] Assignee: Hunter's Specialties, Inc., Cedar Rapids, Iowa

[21] Appl. No.: 740,040

[22] Filed: Jul. 31, 1991

[51] Int. Cl.$^5$ ............................ A63H 5/00; B32B 31/16
[52] U.S. Cl. .................................. 446/207; 156/73.1; 156/580.1
[58] Field of Search ............... 446/202, 203, 204, 206, 446/207, 208; 156/73.4, 73.1, 73.3, 580.1, 580.2

[56] References Cited

U.S. PATENT DOCUMENTS

| | | | |
|---|---|---|---|
| 1,720,813 | 7/1929 | Agnew et al. | 446/202 |
| 2,274,897 | 3/1942 | Horne | 446/202 |
| 2,452,658 | 11/1948 | Horne | 446/202 |
| 2,745,215 | 5/1956 | Puckette | 446/202 |
| 2,833,086 | 5/1958 | Johenning | 446/202 |
| 3,583,094 | 6/1971 | Tribell et al. | 446/202 |
| 3,722,133 | 3/1973 | Morgan | 446/202 |
| 3,738,056 | 6/1973 | Schultz | 446/202 |
| 4,218,845 | 8/1980 | Evans et al. | 446/202 |
| 4,341,037 | 7/1982 | Moss | 446/204 |
| 4,483,097 | 11/1984 | Piper | 446/207 |
| 4,503,635 | 3/1985 | Harrington | 446/46 |
| 4,614,503 | 9/1986 | Skoda | 446/213 |
| 4,637,154 | 1/1987 | Laubach | 446/207 X |
| 4,761,149 | 8/1988 | 052345345 | 446/208 |
| 4,764,145 | 8/1988 | Kirby | 446/208 |
| 4,927,399 | 5/1990 | Mueller | 446/207 |

*Primary Examiner*—Mickey Yu
*Attorney, Agent, or Firm*—Simmons, Perrine, Albright & Ellwood

[57] ABSTRACT

An animal call device is assembled from at least two horseshoe-shaped frame members positioned and supported on opposite sides of one or more strips of pretensioned diaphragm material. The frame members have complementarily contoured facing surfaces, and one of the frame members has energy directing prongs adjacent corresponding apertures in the other of the frame members. Ultrasonic energy is applied to the pronged frame member. The prongs pierce the diaphragm material and contact the other frame member such that the ultrasonic energy melts the material of and about the prongs forming material joints through the diaphragm material. The joints combine with the contoured surfaces to retain the diaphragm material in place, even when several strips are assembled into the diaphragm. The manner of tensioning the diaphragm material includes a first longitudinal tensioning. Portions of the tensioned strip or strips are then clamped to a workframe and, prior to the assembly of the frame members, the diaphragm material is further stretched in a direction transverse to the first longitudinal tensioning. More than two frames may be assembled in a stack by first completing an assembly of two frames and then repeating the process by assembling an additional diaphragm and frame member to the already existing assembly. An outer cover may be added to the frame members to extend peripherally about the frames.

13 Claims, 6 Drawing Sheets

ANIMAL CALL, AND METHODS OF AND APPARATUS FOR MAKING SAME

BACKGROUND OF THE INVENTION

1. Field of the Invention

The invention relates generally to devices for mimicking animal sounds, some of these devices being known as turkey calls or elk calls, for example, and to methods of and apparatus for making such animal calls.

2. Discussion of the Prior Art

Conventionally, animal call devices, referred to as animal calls, may be made by craftsmen on a piece by piece basis. The sounds generated by of one animal call may be tuned by the person making the call until the precise sound quality has been achieved. However, in order to provide animal calls on a commercial basis, simple assembly apparatus is desirably used to increase speed of production and allow the manufacture of the animal calls in some quantity. The individual touch provided by the craftsman is less likely to be found in such manufactured animal calls. It may therefore be desirable to improve the manufacturing techniques of animal calls, such as elk calls or turkey calls, and to also improve the resulting product. The type of animal call which as a particular example may be improved by the present invention, is a device consisting of a somewhat "U"-shaped folded frame between which two or even more resilient diaphragms may be stretched to act as reeds. A typically O-shaped aluminum frame may be folded across a diametrical line over onto itself, the folding operation capturing, for example, two resilient diaphragms between the two folded over frame halves. An outer tab on one of the halves may be folded over against the other half of the frame to retain the two frame halves together. Subjecting the frame halves to a linear crimping operation after folding them is intended to increase the retention of typically latex rubber sheets of the diaphragms which function as reeds of such prior art calls. Making calls in a conventional manner as outlined above tends to introduce errors in tensioning the diaphragm to a desired amount of "stretch" across the frame. Even if a certain amount of tension is imparted to the latex rubber sheet, as it is stretched across the frame to be captured by the folding and crimping operations, the rubber latex may tend to slip out from between the two frame halves even after the crimping operation. The crimping operation, though forming the ridge, appears not to establish direct contact by one half of the frame with the other half of the folded over frame.

Another problem that has existed with respect to conventional animal calls, and the manner in which they are being made, relates to a lack in repeatability or consistency in the characteristics of the call devices. Typically latex rubber sheets may be purchased in rolls of latex film sheet material, for example, of a thickness of four thousandth of an inch. The film is manufactured to a width which is typically much wider than desirable. The original rolls of latex film are therefore preferably slit into narrow rolls of approximately two inch in width, for example. The film is then pulled off the roll and stretched across the discussed aluminum frames. A torque or friction drag may be exerted on the shaft of the roll, such that a certain constant tension in the unreeling material might be expected. However, it has been found that the tension at which the material unreels from its storage roll is not constant, a precise tension in the material being not readily ascertainable. It is believed that slitting the rolls to their desired width may cause the material of adjacent layers to adhere to each other with greater or lesser forces of adhesion, requiring a indeterminable amount of force to separate the adjacent layers from each other. Though not readily apparent, the calling sound characteristics of calls appear to be changed by the varying tension in the latex rubber strip as the animal calls are being assembled.

Consequently, a need is seen for improving the manufacturing techniques of animal call devices. It would be particularly desirable to allow the diaphragms or reeds to be stretched across frames of the described shape with a greater degree of precision and with a greater degree of repeatability. It is further desirable to provide a more consistent hold on the diaphragms or reeds of the animal call devices.

SUMMARY OF THE INVENTION

The present invention addresses problems related to inconsistencies in the manufacture of animal call devices. Thus, animal calls in accordance with the invention are made by providing a substantially uniform amount of stretch for diaphragm material used as reeds for animal call devices.

One general object of the invention is to provide a method of defining with repeatability the amount of tension of reeds of animal call devices.

It is another object of the invention to provide an apparatus which repeatedly tensions diaphragms of animal call devices to a predetermined amount of stretch prior to the diaphragms being captured by a frame in the course of assembly of the animal call device.

It is yet another object of the invention to align a plurality of reed diaphragms with respect to each other such that leading edges of diaphragm members have a certain relationship with respect to each other.

It is a further object of the invention to provide a frame for one or more reeds which frame securely captures the reeds between adjacent frame members.

It is yet another object of the invention to repeatedly assemble a number of animal call devices to substantially identical specifications.

Thus, another object of the invention is to provide a plurality of animal call devices each with substantially the same sound producing characteristics as any other one of the plurality of devices, thereby providing an improved degree of consistency in performance.

A further object of the invention is to provide animal calls with a reed or diaphragm of a predetermined tension which may be selected as any incremental value from a range of available tension values.

In accordance with the invention, an animal call device is provided which includes a diaphragm material stretched with a predetermined amount of tension. The diaphragm material is held by first and second frame members which are disposed on opposite side of the diaphragm material. The frame members have complementarily contoured adjacent surfaces and a plurality of spaced junction points which extend through the diaphragm material and which join the frames to each other, such that the contoured surfaces clamp the diaphragm along the length of the frame members.

In accordance with a further feature of the invention, an elongate strip of diaphragm material, a portion of which is to be stretched across a frame with a predetermined amount of tension, is advanced in a substantially untensioned state from a supply of the material over a predetermined first distance. The strip is clamped at first and second ends of the first predetermined distance, and the clamped ends are moved apart by a second predetermined distance, the strip between the first and second clamped ends assuming a predetermined tension in the ratio of the second predetermined distance divided by the first predetermined distance. An intermediate portion of the tensioned strip of material is then clamped to a workframe at leading and trailing edges thereof to retain the assumed tension of the strip, while the tension of the portion of the strip of material between the workframe and the supply is released. Frame members are then permanently joined through the tensioned portion of the strip. The tensioned strip is retained within the confines of the joined frame members after the strip portion is release from the workframe.

According to another feature of the invention, an apparatus for assembling animal calls includes a provision for stretching a diaphragm material by a predetermined amount. A clamping provision retains the predetermined amount of stretch. First and second frame members are then advanced toward each other from oppositely facing major surfaces of the diaphragm material, are ultrasonically vibrated to pierce through the material and become welded into locking engagement with each other to retain the diaphragm material with the predetermined amount of stretch between the welded frame members.

Other features and advantages of the invention will become apparent from the detailed description of the invention in reference to a preferred embodiment thereof.

BRIEF DESCRIPTION OF THE DRAWINGS

The description of a particular embodiment of the invention may be best understood when the detailed description is read in reference to the appended drawings wherein.

DETAILED DESCRIPTION OF THE INVENTION

Figure 1:
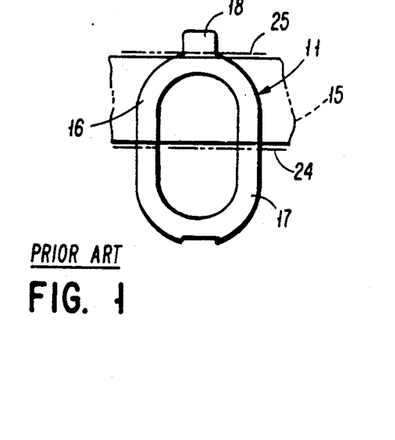
FIG. 1 shows an open aluminum frame of a known conventional animal call device.
Figure 2:
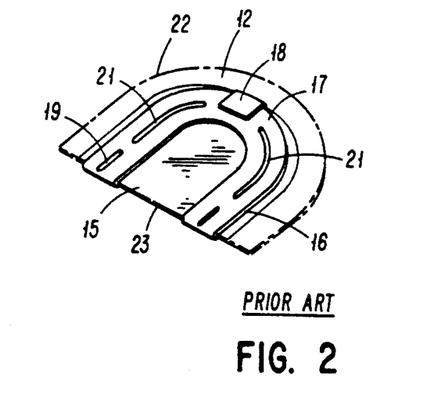
FIG. 2 shows a somewhat simplified representation of an animal call in which the aluminum frame of FIG. 1 has been shaped in accordance with known techniques to retain a diaphragm material as reed between two folded halves of the frame.

FIGS. 1 and 2 of the drawings depict conventional animal call elements and there typical assembly. In FIG. 1 there is shown an aluminum frame 11 as it may be used in the assembly of a turkey call 12, as shown in simplified form in the pictorial representation in FIG. 2. In the assembly of the turkey call 12 as an example of a conventional animal call, one or more pieces of resilient diaphragm material 15, such as a latex rubber material, become mounted between two frame halves 16 and 17 as they are being folded onto each other. A tab 18 holds the two folded frame halves 16 and 17 to each other. A crimping operation, by which material of the frame half 17 may be formed inward toward the frame half 16, for example, generates an inner ridge between the two adjacent frame halves 16 and 17 for holding the diaphragm material 15, as shown by typical end and inner indentations 19 and 21. The animal call may typically be encased in a suitable soft rubber or plastic outer material 22, such that the animal call may be placed in and under the roof of the mouth of a potential user, the exposed edge 23 of the diaphragm directed toward the front of the mouth. Blowing air over the tongue and against the call 12 is then expected to produce a sound imitating that of a turkey.

FIG. 1 shows the one half 16 of the frame 11 covered by the stretched piece of diaphragm material 15, between indicated bend line 24 and a bend line for the tab 18, shown at 25. The frame half 17 is folded over the diaphragm material 15 along the bend line 24, and is then retained by bending the locking tap 18 over on the frame half 17, as shown in FIG. 2. The referred to staking operation would typically follow, after which the outer material 22 may be applied.

Figure 3:
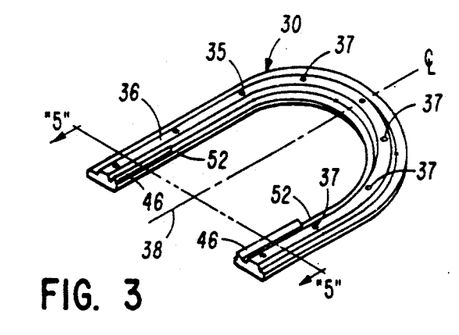
FIG. 3 is a base frame member in accordance with a particular embodiment of the present invention.
Figure 4:
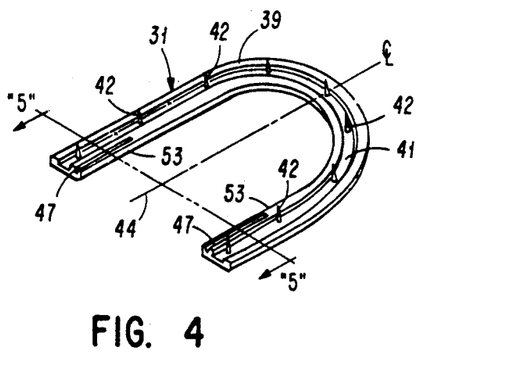
FIG. 4 is a top frame member to be joined to the base frame member in accordance with a particular embodiment of the invention.
Figure 6:
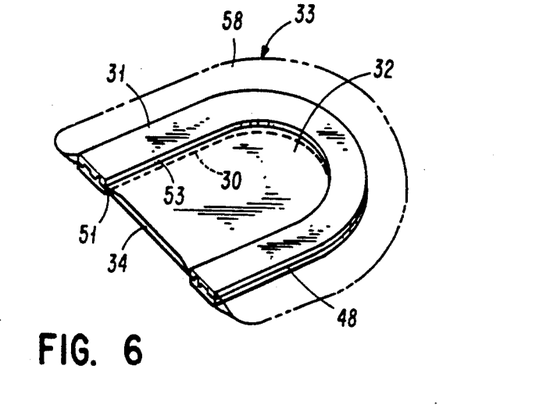
FIG. 6 is a pictorial representation of an assembled animal call.

FIGS. 3 and 4 show respective, complementary frame members 30 and 31 which are substantially similar, elongate and in the shape of a horseshoe, each substantially enclosing a planar area 32. The frame members become joined to each other as supporting members of an animal call 33, an assembled representation of which is shown in FIG. 6. The animal call 33 in FIG. 6 has a diaphragm or reed 34 stretched across the now common area 32 encompassed jointly by the two frame members 30 and 31. The diaphragm is tensioned in a predetermined manner as will become apparent from the further description herein. The diaphragm 34 and its tension is then captured and retained with the established between the stacked horseshoe shaped frame members 30 and 31. As becomes apparent from FIGS. 2 and 6, various differences of the animal call 33 over the animal call 12 reside in the features of the frame members 30 and 31, their assembly, and their structural details. Both frame members 30 and 31 have the referred to horseshoe shape, similar to the folded shape of the prior art aluminum frame 11. When assembled, as shown best in FIG. 6, the frame members 30 and 31 are congruent, stacked adjacent one another to mutually, at least partially, encompass the common internal area 32 across which the diaphragm 34 is stretched. In contrast to the folded aluminum frame the frame members 30 and 31 are initially discrete elements. The frame member 30 is a base frame member, as opposed to the corresponding upper, top frame member 31, and features centrally along an inner surface 35 a longitudinally extending boss or flat ridge configuration 36. A number of apertures 37, in the preferred embodiment there are nine apertures, extend at spaced locations centrally of the ridge 36 into the frame member 30. The frame member 30 is also symmetrical with respect to a longitudinal centerline 38. Consequently, identical frame features are located at mirror image locations with respect to centerline 38.

An inner surface 39 of the top frame member 31 features centrally along its horseshoe type configuration a recess 41 which is complementary in shape and configuration to the ridge 36 of the base frame member 30. Cone shaped prongs or pointed protrusions 42 extend centered from the recess 41. The protrusions or prongs 42 correspond in location and number to the apertures 37 in the base frame member 30. At least at their roots, the prongs are preferably of a diameter which exceeds the diameter of the apertures 37 in the base frame member 30. The top frame member 31 is in the preferred embodiment also symmetrical about a centerline 44 extending longitudinally through the horseshoe shape of the top frame member 31. Further complementary features of the base and top frame members 30 and 31 are inner rim ridges 46 and corresponding inner rim grooves 47, respectively, located at inner lower ends of the frame members 30 and 31. The described complementary features on the mutually facing surfaces 35 and 39 seat the frames 30 and 31 with respect to each other upon assembly and contribute to holding the diaphragm under tension. Thus, any excess material of the diaphragm 34 may be trimmed closely about a peripheral edge 48 of the stacked frame members 30 and 31, as shown in FIG. 6. As may be realized from the further description hereof, the inner rim ridges 46 and corresponding grooves 47 provide for additional grasping action on the diaphragm material at a lower opening 51 of the animal call 33. The ridges 46 and grooves 47 on opposite portions of inner rims 52, 53 (see FIGS. 3 and 4) of frame members 30, 31, respectively, also provide a precisely spaced distance between which the diaphragm or reed 34 will vibrate freely to generate a sound.

The frame members 30 and 31 are preferably molded elements of a thermo-plastic material. The frame members 30 and 31 may be molded in a typical state of the art injection molding operation. The thermo-plastic properties of the material are, however, used advantageously in the further assembly of the animal call 33. The prongs 42, also referred to as "energy directors" are used in an ultrasonic welding or bonding operation for assembling the animal call 33. In an ultrasonic welding operation, at least one of the elements to be joined is vibrated at ultrasonic frequencies with respect to the other. The energy is directed through contact points, such as the prongs 42, to generate local heating and melting, particularly of the thermo-plastic materials of the frame members 30 and 31.

Figure 5:
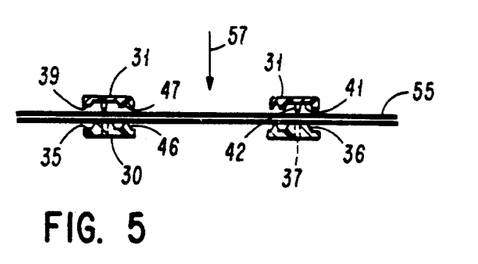
FIG. 5 is a schematic sectional exploded view of end sections of the top and base frame members in stacked relationship with respect to each other and in relationship to interposed diaphragm material.

FIG. 5 is an exploded view showing end sections through "5—5" of the base frame member 30 and the top frame member 31, showing a stacked arrangement of the frame members and one or more strips 55 of the diaphragm material, the diaphragm material ultimately forming the reed or reeds 34 of the animal call 33 in FIG. 6. It should be noted that the respective inner surfaces 35 and 39 of the two frame members 30 and 31 face each other. During the assembly of the frame members, the top frame member 31 is urged toward the base frame member 30 in the direction of arrow 57. The diaphragm material is preferably a latex rubber material of preferred thicknesses of four or six thousandth of an inch. It should be understood, however, that any particular thickness of the diaphragm material is not critical for purposes of the described invention and greater or lesser thicknesses of material may be acceptable.

The assembly of the top frame member 31 to the base frame member 30 without adhesives for bonding or adhering the diaphragm material to the frames and even to itself requires the intervening diaphragm material to become pierced by the prongs 42. In accordance herewith the frame members 30 and 31 may be welded or bonded to each other by applying ultrasonic energy. The frame members 30 and 31 are urged into contact with each other by moving the top frame member 31 in the direction of the arrow 57 toward the base frame member 30 while the base frame member is firmly supported against movement. Ultrasonic energy is preferably applied through the top frame member 31. The prongs 42 pierce the otherwise resilient and pliable diaphragm material of the strip 55. It is believed that the energy transmitted and concentrated through the prongs 42, referred to as "energy directors", displace the latex rubber material without causing it to tear or shear with progressive tear lines through the diaphragm material. The resiliency of the diaphragm material allows the prongs 42 to penetrate the respective apertures and translate the ultrasonic motion to heat generated between the prongs 42 and the apertures 37 to weld the frame members 30 and 31 to each other through the intervening diaphragm material. The terms "bond" or "weld" are used interchangeably herein, it being understood that the ultrasonic energy causes local softening or even melting of the thermoplastic material of the frames 30 and 31. As a result the frames move into proximity of each other and become adhered to each other through the prongs 42 seating themselves within the apertures 37. The complementary features, namely the prongs 42 and apertures 37, the ridge 36 and the respective recess 41, and the ridges 46 and corresponding grooves 47 firmly retain the diaphragm material in a stretched and tensioned state as existing at the time the frame members 30 and 31 become welded.

In the completion of the animal call 33 as shown in FIG. 6, excess diaphragm material about the periphery 48 of the welded frame members 30 and 31 is trimmed. The diaphragm material within the bounds of the frame members remains as the reed or reeds 34 of the animal call 33. An outer cover 58 of suitably flexible material as in the prior art outer material 22 (see FIG. 2) applied to the welded frame members 30 and 31 completes the assembly of a particular animal call 33. It should be understood that the assembly process of the animal call 33, as described with respect to FIGS. 5 and 6, can be modified. Variations in the process and in the structure of the animal calls 33 are possible without departing from the scope and intent of the present invention.

Figure 7:
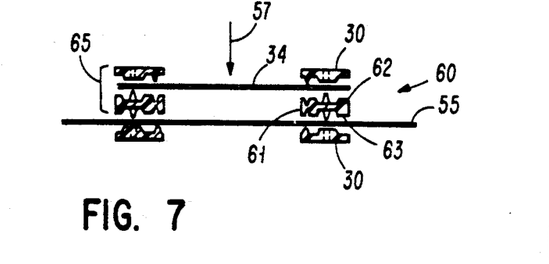
FIG. 7 is a schematic sectional exploded view of stacked materials of an alternate embodiment of an animal call including an intermediate frame member and two base frame members as shown in FIG. 3.

FIG. 7 is a schematic, exploded view of a section through elements in accordance with the invention, modifying a common animal call known as a stacked call which is designated generally by the numeral 60. It is to be realized, the modified animal call 60, as assembled, has a similar overall shape as the animal call 33 shown in FIG. 6. The animal call 60 would include at least two of the reeds 34 of trimmed diaphragm material when the assembly of the frame members is complete, distinguished in that the reed members will be spaced by an intermediate frame member 61. The intermediate frame member 61 differs from the already described base and top frame members 30 and 31 by having both major, horseshoe shaped surfaces 62 and 63 contoured in the same configuration as, the inner surface 35 of the top frame member 31. The prongs 42 extend, consequently, from both major surfaces 62 and 63. An assembly sequence of the animal call 60 is preferably broken down into two similar operations, substantially as described with respect to the assembly of the animal call 33. An initial assembly operation might proceed as described with respect to FIG. 5. The intermediate frame member 61 would be substituted for the top frame member 31. The assembly proceeds by ultrasonically welding the intermediate frame member 61 through interposed strips 55 of diaphragm material to the base frame member 30. The strip or strips 55 of material may subsequently be trimmed as usual, leaving the material which constitutes the reed 34. This first operation forms a subassembly 65. Further in reference to FIG. 7, the subassembly 65 is now used in substitution for the top frame member 31 in the originally described assembly process for the animal call 33. Placing the subassembly 65 for further assembly, the base frame member 30 underlies the subassembly 65, such that the intermediate frame member 61 faces downward toward a second base particular advantages are derived by the preferred pneumatic power applications, it is apparent that many if not all described functions can be implemented by other power or motive forces within the scope of the invention. As an overview, the assembly apparatus 70 includes a diaphragm material handling station 71, a front edge alignment station 72, a diaphragm material tensioning station 73, an incremental feed mechanism 74, a tension lock-in station 75, a welding station 76 and a control console 77. The various elements of the apparatus 70, as will be further described, may be mounted generally with respect to an apparatus support structure or frame, designated generally by numeral 78.

Figure 8:
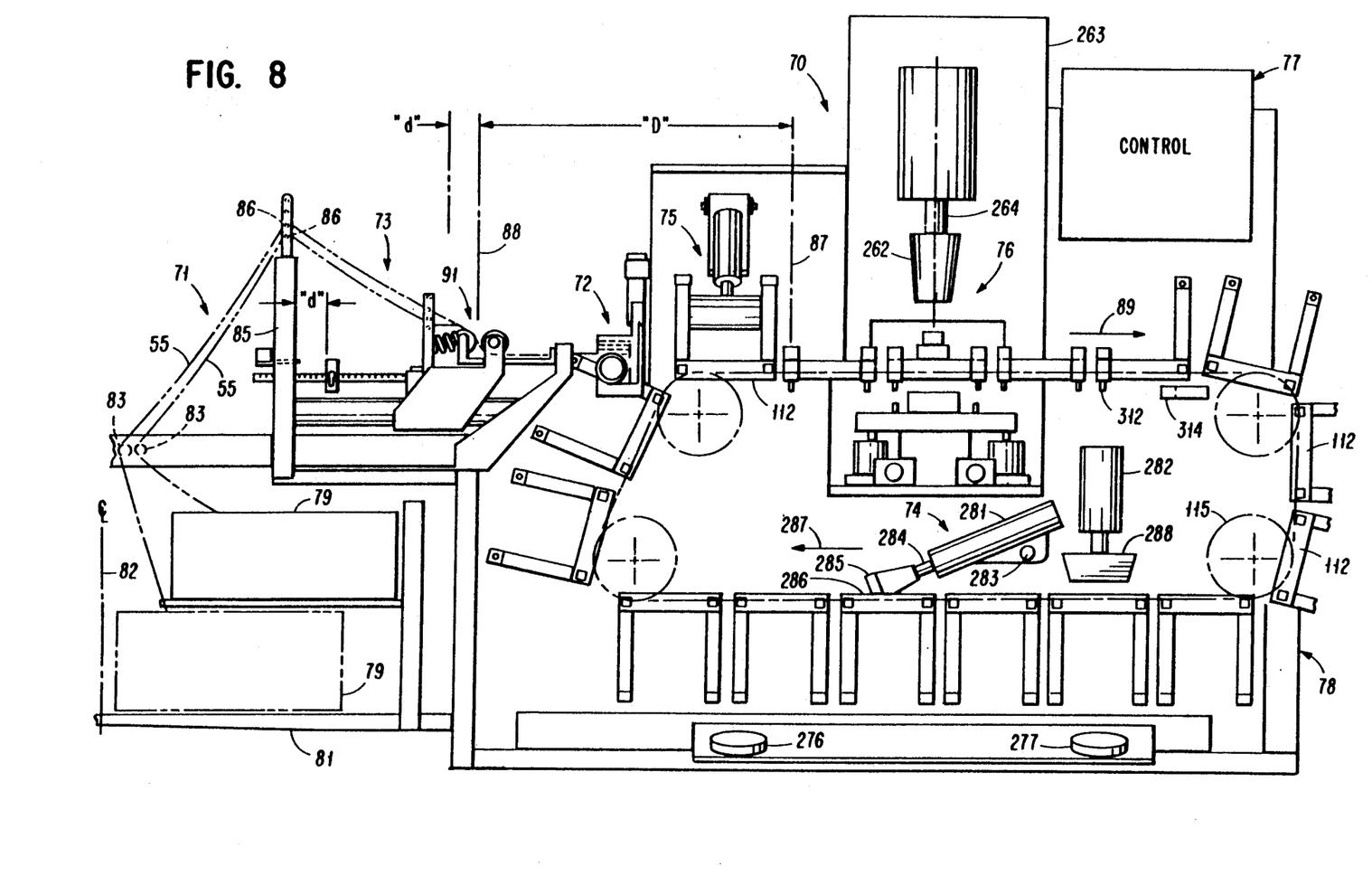
FIG. 8 is a somewhat schematically simplified frontal view of apparatus for assembling animal calls in accordance with the present invention and showing various features as a preferred embodiment of the invention.

The diaphragm material handling station 71 has the capability of providing simultaneously more than one strip 55 of the diaphragm material. The preferred latex rubber material for forming the reeds 34 may be fed simultaneously in strips 55 of four and six thousandth of an inch thickness, and of course in other thicknesses, if so desired. Also, other materials as well as a more complete range of thicknesses may be used to form the reeds 34 in accordance herewith. To alleviate previously experienced variations in tension of material as the material is unreeled from rolls of strips of the respective diaphragm material, the material is first unreeled and is placed in a "fan fold" stacked manner into storage trays 79, as indicated in phantom lines in FIG. 9. Stacking layers of the material eliminates a condition in which adjacent layers on a reel tend to stick to each other, thereby increasing the tension of the unreeled material in an unpredictable manner. A tray rack 81 may be configured in any of a number of Ways. Preferably, the tray rack 81 holds from one to four separate trays 79. As shown in FIG. 8, four of the strips 55 can be fed from the four respective trays 79 simultaneously. It should be noted, however, that for many common animal call configurations only one or two of the strips 55 may be fed to a welding operation at the same time. The trays 79 are preferably arranged in the tray rack 81 such that the strips 55 are fed from a center position 82 of the rack 81. FIG. 8 shows one half of the preferred tray rack 81 broken off at its center 82. Guide rollers or low friction posts 83 preferably maintain the individual strips 55 separated from each other. The strips 55 are routed from the rack 81 to an upright support 85, the support 85 also featuring horizontally disposed guide posts or rollers 86 for separating and supporting each of the strips 55 at what constitutes the highest point of support, for each of the strips 55. From the upright support 85 the path of the strips 55 slopes downward toward the tensioning station 73.

The tensioning station 73 tensions the strip or strips 55 in a predictable and repeatably ascertainable manner. An initially unstretched, predetermined length of the strip 55 (as indicated by "D") is grasped and extended by a preselected distance "d". The distance "D" is measured in each instance from a reference position 87 to a clamping position 88 backwards with respect to the general direction of travel of the strip 55 as indicated by the arrow 89. At the beginning of each tensioning cycle of the apparatus 70, a leading tensioned portion of the strip 55 is advanced until a trailing unstretched length of the strip has advanced to the reference position 87. The strip 55 is fixedly held at the reference position 87 and from there extends substantially without tension rearward to at least past the clamping position 88. A clamping mechanism 91 clamps onto the strip 55 at the clamping position 88 to lock in a fixed length of the strip 55 between two clamped positions 87 and 88 which define the end points of the distance "D". The operation of the clamping mechanism 91 and other elements of the tensioning station are best explained with respect to FIG. 9.

Figure 9:
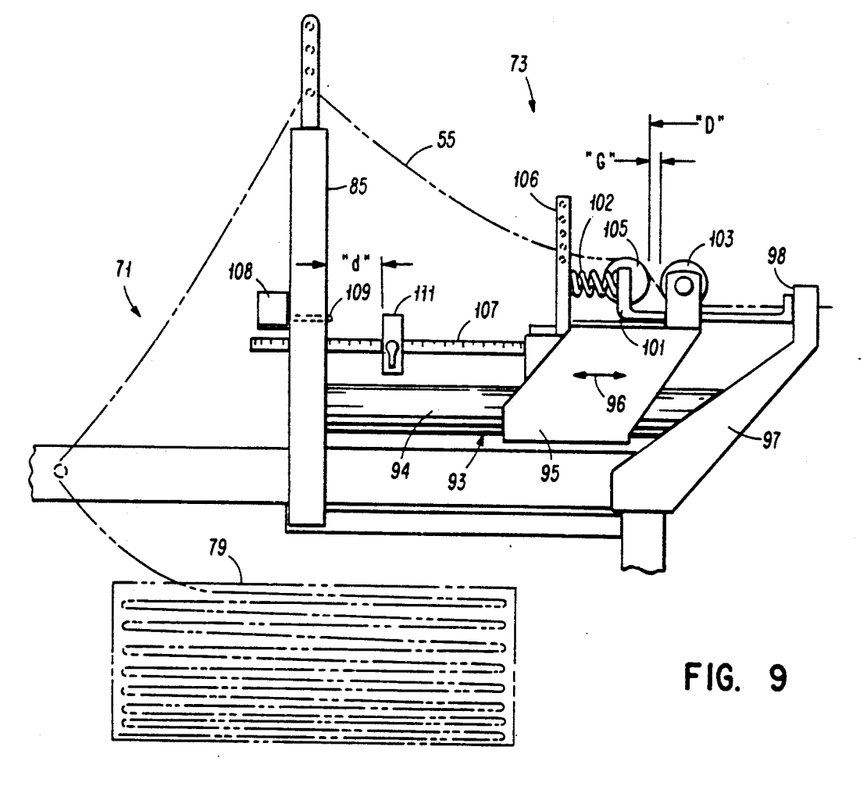
FIG. 9 is a side view of a diaphragm tensioning station of the apparatus shown in FIG. 8.

FIG. 9 shows a simplified arrangement of the diaphragm material handling station 71 and shows details of the tensioning station 73. A single strip 55 is shown as being advanced from the handling station 71 past the tensioning station 73. The tensioning of the strip 55 occurs by activation of a pneumatic linear actuator 93. The actuator 93 includes a stationary, air driven cylinder 94, preferably a band type cylinder, functioning without a piston rod. A movable slide 95 is selectively actuated to become displaced in one or the other direction along the cylinder 94, as indicated by arrow 96. The cylinder 94 is fixedly mounted to a support frame 97 having a stop 98 which is fixed with respect to the assembly apparatus 70. A reference guide post assembly 101 is slidably mounted with respect to the slide 95 and is biased by a spring 102 toward a guide roller 103 mounted to the slide 95. A stop arm 104 of the guide post assembly 101 engages the stop 98 during the forward movement of the slide 95 toward the stop 98. Further travel of the slide 95 to its most forward position opens a gap "G" between a guide post 105 of the assembly 101 and the guide roller 103. This most forward position of the slide 95 is the normal rest position of the slide. The gap "G" allows the strip 55 to advance without generating tension in the advancing length of the strip. The strip 55 is fed during its advance from the upright support 85 downward, hanging loosely under its own weight. Just prior to being routed to the guide post 105, the strip 55 may pass through a comb-like spreader guide 106. The spreader guide 106 would keep adjacent strips 55 from contacting each other almost until they actually pass through the gap "G" between the guide post 105 and the guide roller 103. A gauging bar 107 extends from the rear of the slide 95 rearward through the upright support 85. A control switch 108 is mounted to the upright support 85, with an actuator lever 109 of the switch extending forward through the support 85. A gauge stop 111 is adjustably mounted to the gauge bar 107. The gauge stop 111 may be slidably moved to a select position along the gauge bar 107 and then be clamped in place. The free distance between adjacent surfaces of the gauge stop 111 and the upright support 85 determines the distance "d" through which the slide 95 can move toward the rear along the cylinder 94. As the slide 95 begins to move toward the rear, the guide post 105 remains stationary. The guide roller 103, moving in concert with the slide 95, moves rearward toward the guide post 105, thereby closing the gap "G". The strip 55 being interposed between the guide post 105 and the roller 103 is grasped there between. The slide 95 travels through the distance "d" until the gauge stop 111 displaces the switch actuator 109, in turn actuating the switch 108 and stopping further air from being driven into the cylinder 94. The amount of stretch in the strip 55 at the time when the movement of the slide 95 is stopped is substantially equal to the distance "d" travelled by the slide 95. A typical amount of stretch imparted into the diaphragm material may be, for example, a distance d=2.625 inches, with the unstretched distance being D=13.25 inches, the stretch amounting to about 20 per cent.

Figure 10:
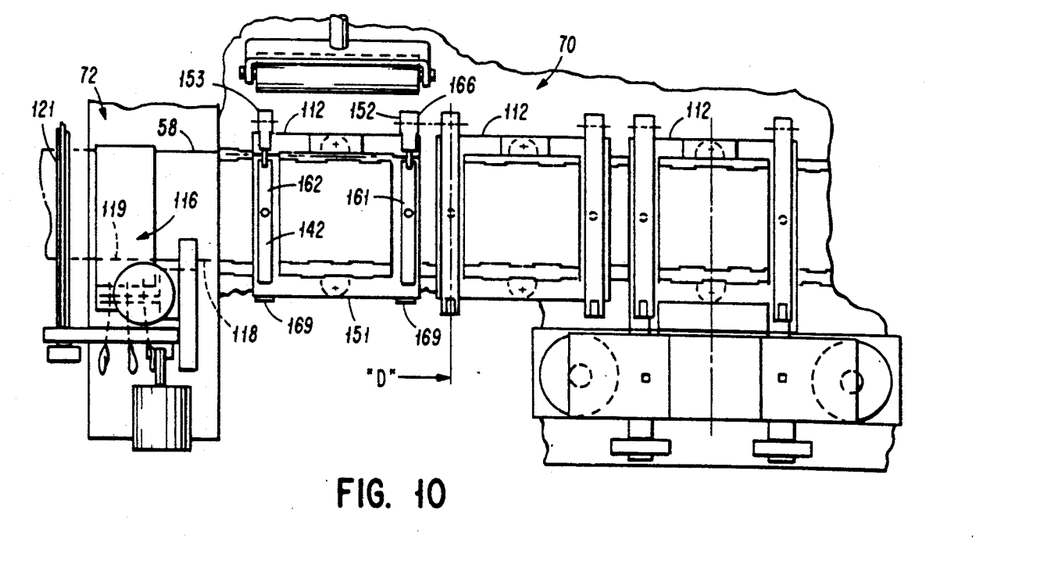
FIG. 10 is a partial top view of the apparatus shown in FIG. 8, showing a diaphragm edge alignment station and workframes attached to a chain conveyor drive of the apparatus, the workframes being disposed at respectively adjacent workstations.

FIG. 10 is a top view of the assembly apparatus 70, showing three of a plurality of workframes 112 also referred to as "cars" which are arranged on, and attached to, a chain conveyor drive 115, as best seen in FIG. 8. The cars 112 provide a unique and significant function in the assembly of the animal call devices. A clamping function of the cars 112 may be best understood from the description below in reference to FIG. 12. The clamping function allows a precisely defined length portion of the entire tensioned length of the strip or strips 55 of the diaphragm material to be locked in and retained in the further assembly process of the animal call 33. Thus, at first the length "D" of the strip 55 is subjected to a precisely determined amount of tension in the longitudinal direction of the strip 55. Then a portion of the strip 55 under tension is locked to one of the cars 112 during each assembly cycle of the apparatus 70. The tension of the portion locked in by each such car 112 is preserved and may be subjected to additional tension in the plane of the locked in strip 55, but in a direction orthogonal to the original longitudinal tension in the strip 55. The additional tensioning of the strip 55 is best understood from the description in reference to FIGS. 13 and 14.

Figure 11:
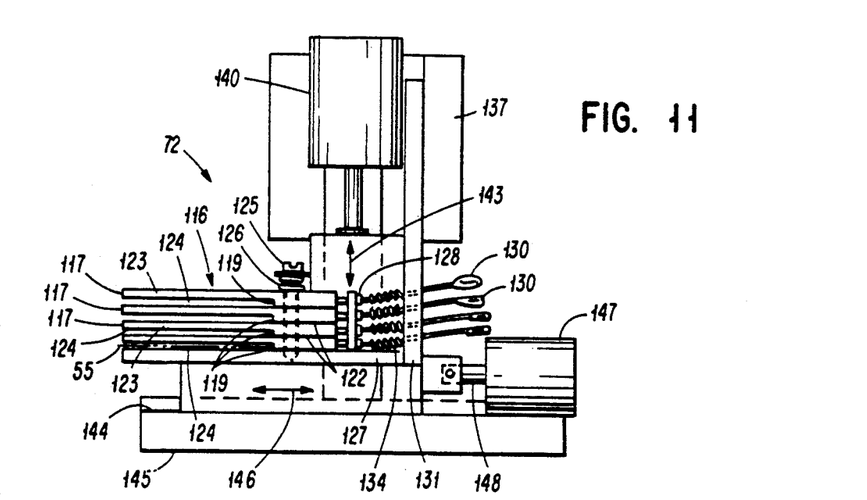
FIG. 11 is an end view of the diaphragm alignment station, a top view of which is shown in FIG. 10.

Referring to FIG. 10 and also to FIG. 11, ahead of the three cars 112 shown in FIG. 10 is the front edge alignment station 72 which provides for front-to-rear alignment of any one or a number of the strips 55 with respect to the cars 112. The terms "front" and "rear" are used relative to the apparatus 70, the direction toward the front being outward from the view shown in FIG. 8, toward an operator, while "rear" means the opposite, into the apparatus as viewed in FIG. 8.

The front edge alignment station 72 includes a stack assembly 116 of individual adjustment stops 117 (see FIG. 11) for aligning a front edge 118 of each respective strip 55 of preferably one through four strips with respect to an edge guide surface 119. A vertical positioning guide 121 adjacent the stack assembly 116 is positioned ahead of the stops 117. Horizontal guide surfaces of the guide 121 align the strip 55 substantially with the plane of the edge guide surface 119 and provide for a straight line engagement of the strip with the guide surface 119. The vertical positioning guide 121 is mounted in fixed relationship with respect to the stack assembly 116 of the adjustment stops 117, thus moves vertically and horizontally with respect to the stack assembly 116.

FIG. 11 shows the adjustment stops 117 viewed in the direction of travel of the strip 55. The stops 117 are vertically mounted adjacent one another to form the stack assembly 116. Each of the stops 117 is a slide element having a frontal bearing portion 122 of a first thickness and a stepped down thickness along a rear portion 123, forming the respective guide surface 119 against the bearing portion 122 and a gap 124 adjacent thereto. The strip 55 is guided through the gap 124, the front edge 118 of the strip 55 disposed to become horizontally aligned by the guide surface 119. The adjustment stops 117 may be urged toward each other or may otherwise be clamped to be retained in their stacked positions. A preferred manner of a retaining the stops 117 is by a machine screw 125 and a spring 126 mounted between the head of the machine screw 125 and an upper surface of the stack assembly 116. The spring 126 exerts a clamping force with respect to a base bracket 127 against the stops 117. The guide surfaces 119 of respective adjustment stops 117 are individually adjustable to the front or rear with respect to each other by turning adjustment screws 128. Access to the closely positioned screws 128 is provided by adjustment extensions 130. The extensions 130 are mounted through a support plate 131 at slight angles with respect to each other, and are urged toward the adjustment screws 128 by springs 134. Thus outer ends of the extensions 130 become spaced because of the diverging relationship among the extensions, such that outer ends of the extensions may readily be turned between fingers for a desired inward or outward adjustment of the respective adjustment stops 117. The base bracket 127 is slidably mounted to a support 137 for vertical movement. Vertical movement of the base bracket 127 is preferably controlled by one of the various air cylinders as the preferred activation mode of the apparatus 70. The particular vertical cylinder 140 positions the stack assembly at one end of its stroke to align the gaps 124 in a straight line of the path of the strip 55 as the strip is advanced in the direction of the arrow 89 (see FIG. 8). At the other end of the stroke of the cylinder 140, the base bracket 127 is driven down to urge the strip or strips 55 into a plane of an upper surface 142 of the adjacent workframe 112 (see FIG. 10). Moving the strips 55 downward into the plane of the workframe 112 causes the strips to rest flatly against the upper surface 142 of the respective workframe 112 to be clamped thereto without wrinkles or folds. Once the strip or strips 55 have been clamped to the workframe 112, the air cylinder 140 returns the base bracket 127 to its upper position, the up and down movement being indicated by arrow 143.

To alleviate possible causes of unpredictable drag on the strip 55 while it is being advanced, the stack assembly 116 may be further mounted to a slide track 144 of a horizontal support 145 to move horizontally inward and outward with respect to the assembly apparatus 70 in directions indicated by arrow 146. Activation of a drive cylinder 147 controls the position of the stack assembly 116. While the strip 55 is being advanced, the stack assembly is moved forward with respect to the apparatus 70, thus toward the right as viewed in FIG. 11. Subsequently to the advance of the strip or strips 55 the cylinder 147 and its respective piston as indicated at 148, drives the stack assembly 117 inward toward the left. In the leftmost position of the stack assembly the guide surfaces 119 engage and align the respective front frame member 30. As in the prior operation, the subassembly 65 is now displaced downward in the direction of the arrow 57 (in FIG. 7) toward the second base member 30. Upon application of ultrasonic energy, the second set of prongs 42 pierce the interposed strip 55 of diaphragm material and weld the subassembly 65 to the second base frame member 30. The assembly of the animal call 60 is completed by trimming the strip 55, leaving the reed 34 within the confines of the assembled frame members, and then applying the outer cover 58, shown in FIG. 6. One or more of the reeds 34 may be individually shaped or cut back, which is preferably done after the animal call has bee assembled as described. Such shaping modifies the tone quality of the reeds 34. These cut back variations of the reeds 34 are generally known in the art and have no bearing on the assembly processes and structural elements described herein.

FIG. 8 is a general side view of an assembly apparatus, designated generally by the numeral 70, for implementing the described assembly steps of the animal call structures in reference to FIGS. 5 and 7, for example. It should be noted that the described ultrasonic welding operation is preferably implemented by commercially available ultrasonic plastic welding or bonding apparatus. One such apparatus, used in the described embodiment, is available under the trade designation Model 43A255, from Dukane Corporation, Ultrasonics Division of St.Charles, Ill., for example. The apparatus may be further operated by computer equipment, as is also available from the above vendor in conjunction with the referred to welder. In that ultrasonic welding or bonding operations on thermoplastic materials are generally known in the art, other sources of similar ultrasonic bonding or welding equipment may be available. Mechanical movements of the preferred ultrasonic welding equipment are implemented with compressed air as a motive power source. Because compressed air is supplied to the preferred model of ultrasonic welding equipment, the apparatus 70 preferably also uses compressed air for implementing various functions and operations. Though edges 118 of the strips 55 in the desired relationship with respect to each other. Since the alignment of the strips 55 is cyclically repeated before each successive length of the strips 55 becomes clamped to a respective workframe 112, only a small adjustment, if any, may take place in each of the successive alignment operations on the strip 55.

Figure 12:
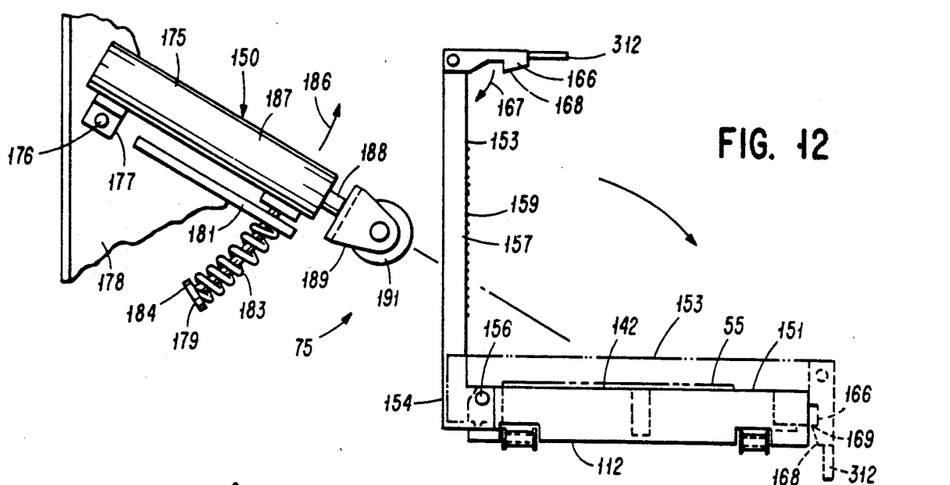
FIG. 12 is an elevational view of a portion of the assembly apparatus in FIG. 8, showing an arrangement for locking a length of a strip of diaphragm material to a workframe.

FIG. 12 shows an end view of one of the frames 112 disposed at the tension lock-in station 75, and further shows a preferred mechanism 150 for closing the workframe 112 and clamping a length of the strip or strips 55 to the workframe 112. The workframe includes a frame member 151 of substantially square configuration, as best seen in FIG. 10. Hinged to the frame member 151 are front and rear clamp arms 152 and 153, respectively. The clamp arms 152 and 153 being essentially identical, arm 153 being described as representative of their function. Hinged ends 154 include pivot bearings 156 which are offset with respect to inner clamping surfaces 157 to move the inner clamping surfaces 157 into substantially contacting, parallel relationship to the upper surface 142 of the workframe 112, indicated by the alternate position of the arm 153 in phantom lines. In the preferred embodiment, each of the inner clamping surfaces is provided with a toothed grasping element 159, such as a portion of a metal cutting saw blade. The respective grasping element 159 may be embedded into the inner clamping surfaces 157 of the clamp arms, with its teeth protruding at least to some distance from such inner clamping surfaces. The toothed grasping elements would preferably engage respective, leading and trailing resilient engagement elements 161 and 162 embedded in the frame member 151 and substantially flush with the upper surface 142 of the workframe. Each of the clamp arms 152 and 153 support at their outermost ends respective, pivotally mounted latch pawls 166. The latch pawls are preferably spring biased into a lock position substantially at right angles to the clamp arms 152 and 153 in the direction of arrow 167. Thus, as the clamp arms 152 and 153 are pivoted into a lock position, a leading camming surface 168 on each of the latch pawls 166 allows each pawl to move over a corresponding latch lug 169 and be urged into locking engagement of corresponding latch surfaces of the pawl and lug, respectively.

The mechanism 150 for closing the clamp arms 152 and 153 consists preferably of a further pneumatic cylinder assembly 175 which is pivotally mounted at a pivot axis 176 by a hinge 177 to a cylinder support bracket 178. A spring holder 179 is attached to and extends downward from the cylinder assembly 175 along a radial arc about the pivot axis 176 through a flange 181 of the support bracket 178. A compression spring 183 is captured between a lower end cap 184 of the spring holder 179 and an underside of the flange 181. As the cylinder assembly 175 pivots from its rest position upward in the direction of arrow 186, the spring is compressed to create a bias force for urging the cylinder assembly 175 toward its rest position. A preferred angle of the rest position of the cylinder 187 is in a range of thirty to forty degrees from the horizontal, as shown in FIG. 12. A piston 188 of the cylinder assembly 175 carries a roller assembly 189 which supports a resiliently surfaced roller 191 in a forked bearing bracket 192. As the piston 188 is driven forward, the roller engages the clamp arms 152 and 153 at about their midpoint and begins to pivot the clamp arms 152 and 153 downward into their closed or locked positions. The piston 188 continues to extend, pivoting the cylinder 187 upward, caused by the engagement of the roller 191 with the clamp arms. The bias force generated by the spring as a result of the pivotal movement of the cylinder assembly 175 causes the roller 191 to urge the clamp arms 152 and 153 into a closed and latched position, as indicated by the alternate position of the pawl 166. Closing and latching the clamp arms 152 and 153 Or a respective one of the oars 112 looks in a portion of the tensioned strip 55, the locked in length of the strip 55 being defined by the spacing between the clamp arms 152 and 153.

Figure 13:
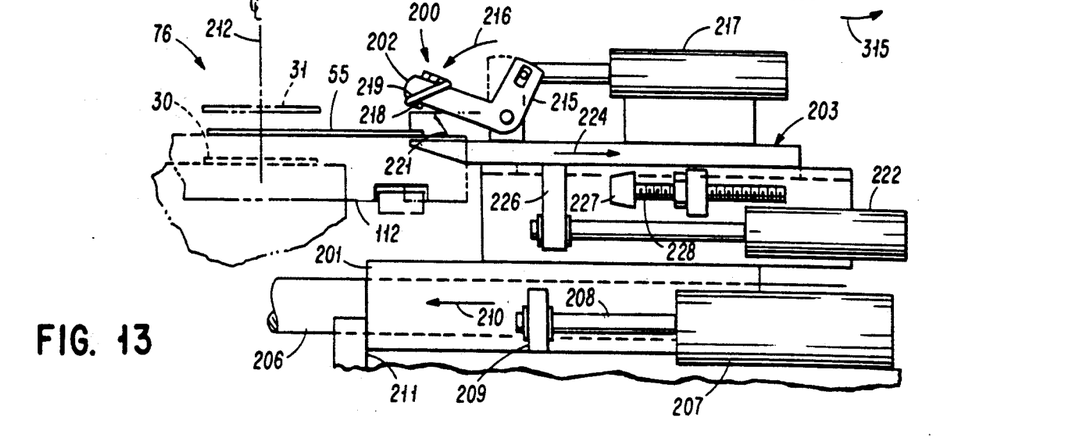
FIG. 13 is an elevational view of a device for further tensioning diaphragm material, located adjacent a welding station of the assembly apparatus.

FIG. 13 illustrates apparatus for an added stretching operation that may be implemented on the clamped portions of the strip 55 of the diaphragm material once the workframes or cars 112 have advanced the material to the welding station 76 and just prior to welding the top frame member 31 to the base frame member 30. In addition to the preselected amount of stretch or tension in the strip or strips 55 in the longitudinal direction of the strip 55, the diaphragm material is further stretched in the same plane 142 but perpendicular or transverse to the initial longitudinal direction of stretch. The added stretch provides a planar rather than a linear tension in the diaphragm material as it is retained between the described frame members 30 and 31 as a reed 34 of the animal call 33. The added stretch tends to prevent wrinkles in the diaphragm material and may shape the front edge 118 of the clamped portion of the strip 55 into a slightly arcuate shape 196 as best seen in FIG. 14.

A gripper mechanism 200, as shown in a side view in FIG. 13 includes in essence a main gripper slide 201, a gripper jaw assembly 202, and a tensioning mechanism 203. The main gripper slide 201 may be slidably mounted on typical guide rods 206 to move perpendicularly to the longitudinal travel of the strip 55. The linear motion of the slide 201 is preferably initiated and controlled by a further cylinder assembly 207 having a piston 208 attached to the slide 201 at 209. Initial movement of the slide 201 is toward the strip as indicated by arrow 210. The forward extension of the slide 201 is preferably arrested at a stop 211 which defines a forward position of the slide 201 with respect to a weld centerline 212. The amount of tension to be introduced into the diaphragm material by the gripper mechanism 200 is controlled by the amount of movement of the tensioning mechanism 203 in a direction opposite to the forward movement of the gripper slide 201. Thus, after the gripper slide 201 has advanced to its forward position, the gripper mechanism 202 is operated. A bell crank type gripper jaw 215 is driven in the direction of arrow 216 by activation of a cylinder assembly 217. A gripper surface is preferably provided by a gripper point threaded through the gripper jaw 215 at 218. The gripper point may be supplemented by a friction type gripper surface, provided for example by an "O-ring" 219 assembled over the threaded gripper point 218. Once the strip or strips 55 of the diaphragm material have been engaged between the gripper jaw 215 and a gripper base 221, a tension cylinder assembly 222 of the tensioning mechanism 203 is activated to withdraw the gripper base and jaw by a predetermined distance in the direction of arrow 224. The gripper base 221 includes a stop lug 226 which is pulled against a bumper 227 of an adjustable backstop 228. The backstop 228 is adjusted to provide the desired amount of stretch in the diaphragm material in accordance herewith. It should be understood that the amount of "transverse" tension which may be introduced by the gripper mechanism 200 into the strip 55 is one of choice and is fully adjustable from substantially none at all to an amount in the range of the already existing longitudinal tension of the strip.

Figure 14:
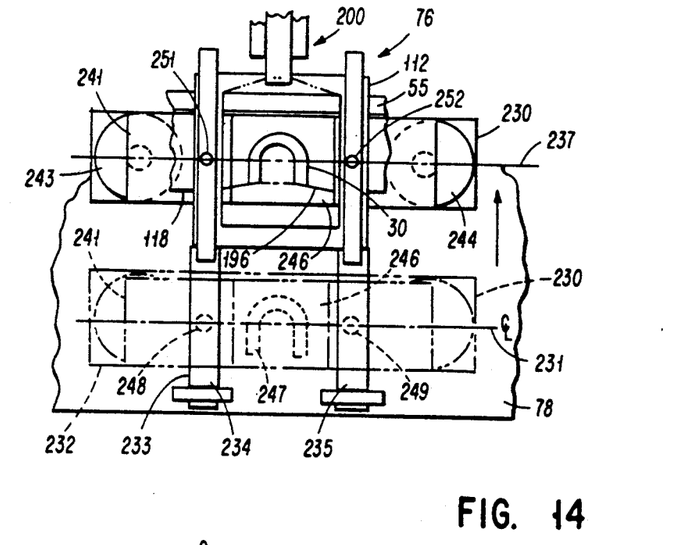
FIG. 14 is a partial top view of the welding station of the assembly apparatus setting forth a relationship of some of the elements.

FIG. 14 is a top view of certain ones of the work loading provisions at the welding station 76. The workframes or cars 112 are sequentially indexed to the welding station 76 (as also shown in FIG. 10) to advance the stretched and clamped portions of the strip or strips 55 of the diaphragm material to be further assembled. At the welding station 76, the base frame member 30 and the top frame member 31 are loaded by an operator into a vertical assembly relationship on opposite sides of the portion of the strip 55 held by the respective car 112. FIG. 14 shows in particular a mechanism for feeding the base frame member 30 into position to become assembled to the top frame member 31. At the very beginning of an assembly cycle of the described apparatus 70, the cars 112 are indexed to present a new, clamped portion of the strip 55 at the welding station 76. At that time, a workholder assembly designated generally by numeral 230 is disposed in an outward or "load" position, shown as an alternate position as indicated by the centerline 231 in FIG. 14. The workholder assembly 230 includes a slider base 232 which is slidably mounted onto a guide track 233, shown as stationary rods 234 and 235. The guide track 233 enables the slider base 232 to move horizontally with respect to the apparatus frame 78. Movement of the slider base 232 may be activated by any convenient reciprocating mechanism to move the slider base 232 between the load position at 231 and a retracted weld position along a centerline 237. In the preferred embodiment the slider base 232 is driven between the outer load and retracted weld positions 231 and 237 by a pneumatic cylinder assembly 238 (see FIG. 15). The cylinder assembly 238 is mounted to the apparatus frame 78, with a piston 239 thereof being attached at a convenient location to the slider base 232. A workholder 241 is disposed above the slider base 232 and is vertically movable with respect thereto. Two pneumatic cylinder assemblies 243 and 244 on opposite ends of the slider base 232 control the vertical movement of the workholder 241. Laterally, however, movement of the workholder 241 is restrained with respect to the slider base 232, such that the movement of the workholder 241 is a straight line vertical movement with respect to the slider base. The workholder 241 has a central pedestal 246 and a recessed seat 247 in a top surface thereof. The seat 247 is shaped to receive and locate the base frame member 30. When a base frame member 30 has been placed or loaded onto the seat 247, the workholder assembly 230 moves into alignment with the centerline 237 which is also a centerline of the welding station 76. Two alignment pins 248 and 249 which extend upward from the workholder 241 on either side of the pedestal 246 become aligned with corresponding locating apertures 251 and 252 of the respective car 112 disposed at the welding station 76. After the workholder assembly has moved into alignment with the centerline 237, the cylinder assemblies 243 and 244 are activated to raise the pedestal 246, elevating the base frame member 30 to an assembly position. In the assembly position the pins 248 and 249 are in engagement with the corresponding locating apertures 251 and 252 of the car 112.

Figure 15:
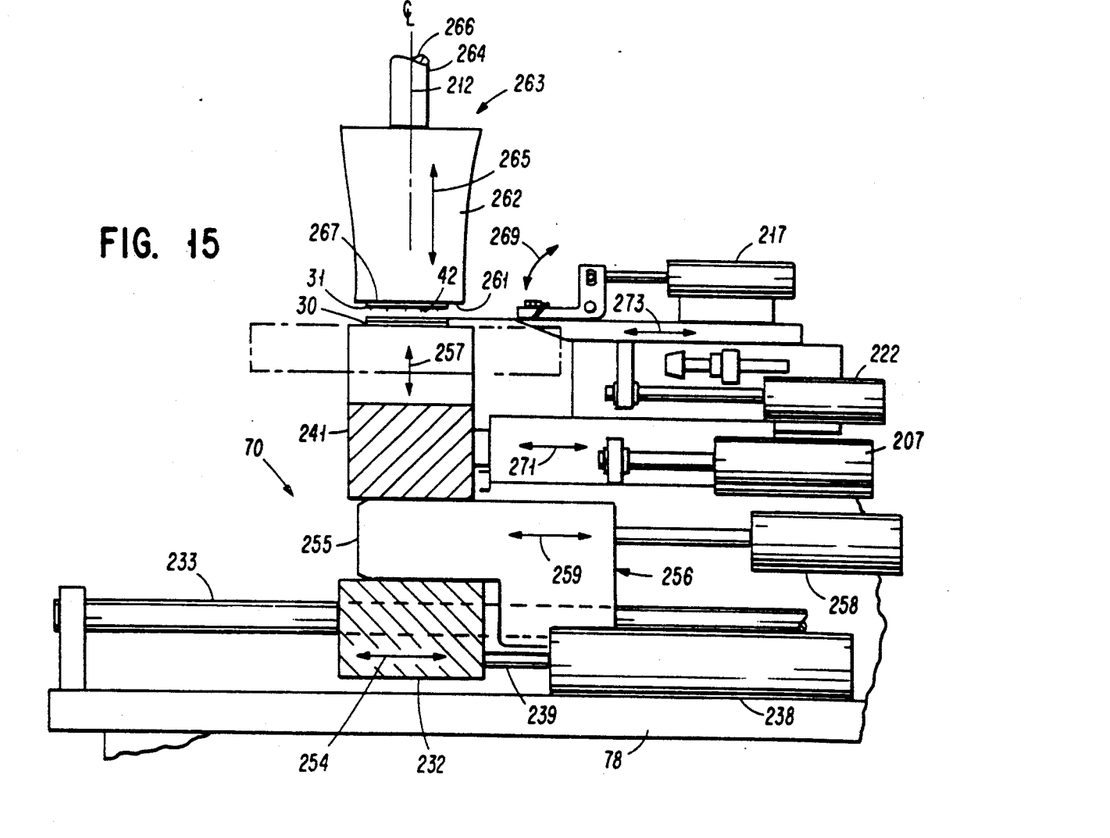
FIG. 15 is a somewhat schematic elevational view of elements disposed at the welding station of the assembly apparatus, shown just prior to the initiation of a welding operation and illustrating various functions performed at the welding station.

FIG. 15 is a schematically simplified side view of elements disposed and functional at or adjacent the welding station 76. The frame 78 of the assembly apparatus 70 supports the guide track 233 with the slider base 232 disposed at the inner or welding position. An arrow 254 indicates schematically the horizontally reciprocating movement capability of the slider base 232 as previously described. A vertical welding axis is shown by the centerline 212. A spacer block 255 of a spacer block assembly 256 has moved forward with respect to the apparatus 70 and into a space between the slider base 232 and the workholder 241. The space block 255 is also slidably mounted to the referred to guide track 233. When the workholder assembly 230 is in the forward position as described with respect to FIG. 14, the spacer block is in a retracted position inward toward the apparatus 70. After the workholder assembly has moved into the welding position, the workholder 241 moves upward, activated by the cylinder assemblies 243 and 244 as described with respect to FIG. 14. FIG. 15 shows the vertical reciprocating movement capability of the workholder 241 schematically by arrow 257. The workholder 241 having moved up, the spacer block 255 moves into the interposed position between the slider base 232 and the workholder 241. The reciprocating movement of the spacer block 255 is preferably implemented by a pneumatic cylinder assembly, though other provisions for conveniently implementing reciprocating motion of machine elements are well known in the art. The reciprocating motion capability of the spacer block into and out of the depicted interposed position, such as by a cylinder assembly 258 is schematically indicated by an arrow 259.

The spacer block 255 provides in the interposed position continuity for a solid support between the frame 78 and the pedestal 246 of the workholder 241. Such solid support is a requirement for accurately locating the base frame member 30 while the top frame member 31 moves under application of ultrasonic energy into a precisely defined position with respect to the base frame member. Prior to commencing the actual welding operation of the two frame members, after loading the base frame member onto the seat 247, the operator may load the top frame member 31. The top frame member 31 becomes attached to a downward facing welding surface 261 of a welding head 262 which is referred to as horn 262. The horn 262 is part of commercially available ultrasonic bonding or welding apparatus 263 disposed at the welding station 76 as shown in FIG. 8, for example. The welding apparatus 263 is solidly mounted to a respective part of the frame 78 of the assembly apparatus 70. The horn 262 is attached to an end of a vertically movable shaft 264 of the welding apparatus 263. Vertical positioning of the shaft 264 is accurately controlled as an inherent function of the welding apparatus 263. Vertical reciprocating motion of the shaft 264 and the horn 262 toward and away from the pedestal 241 is schematically shown by arrow 265. The downward facing welding surface 261 of the horn 262 necessitates a vacuum holding provision 266 for securing the top frame member 31 to a seat 267 in the horn 262. The vacuum provision 266 is available as part of the referred to commercial welding apparatus. Typically a partial vacuum would be drawn at the seat 267 through vacuum ducts which are part of the vacuum holding provision 266.

The welding operation may be performed according to a predetermined time interval and to an absolute distance. The frame members are first brought into contact with each other and then may be ultrasonically energized for a first time period, for example, nine hundredth of a second. After that pressure is applied in addition to the ultrasonic energy for no more than one tenth of a second. However, if during this latter time period melting and fusion of the energy directors, the prongs 42 cause the two frames 30 and 31 to move to a predetermined absolute position with respect to each other, the welding process is considered complete, and the ultrasonic energy is removed. The predetermined absolute distance takes into consideration the distance at which the two frames are totally in contact with the respective inner surfaces 35 and 39 (see FIG. 5) plus the total thickness of all strips 55 of the diaphragm material, less two thousandth of an inch for each layer or strip 55 which is interposed to accommodate a desired amount of compression of the diaphragm material.

FIG. 15 further shows the gripper mechanism in a schematically simplified manner and in an activated condition. The gripper jaw 215 is in engagement with the strip 55, pushing against the gripper base 221 in accordance with the oscillating motion indicated by arrow 269. FIG. 15 showing the welding station 76 just prior to the commencement of the welding operation, the gripper slide is in the forward position toward the welding axis 212, its reciprocating movement being shown by arrow 271. The tensioning mechanism 20 is in the retracted position of its reciprocating movement range shown by arrow 273, the strip 55 being pulled away from the welding centerline 212 by the tensioning mechanism 203.

Figure 16:
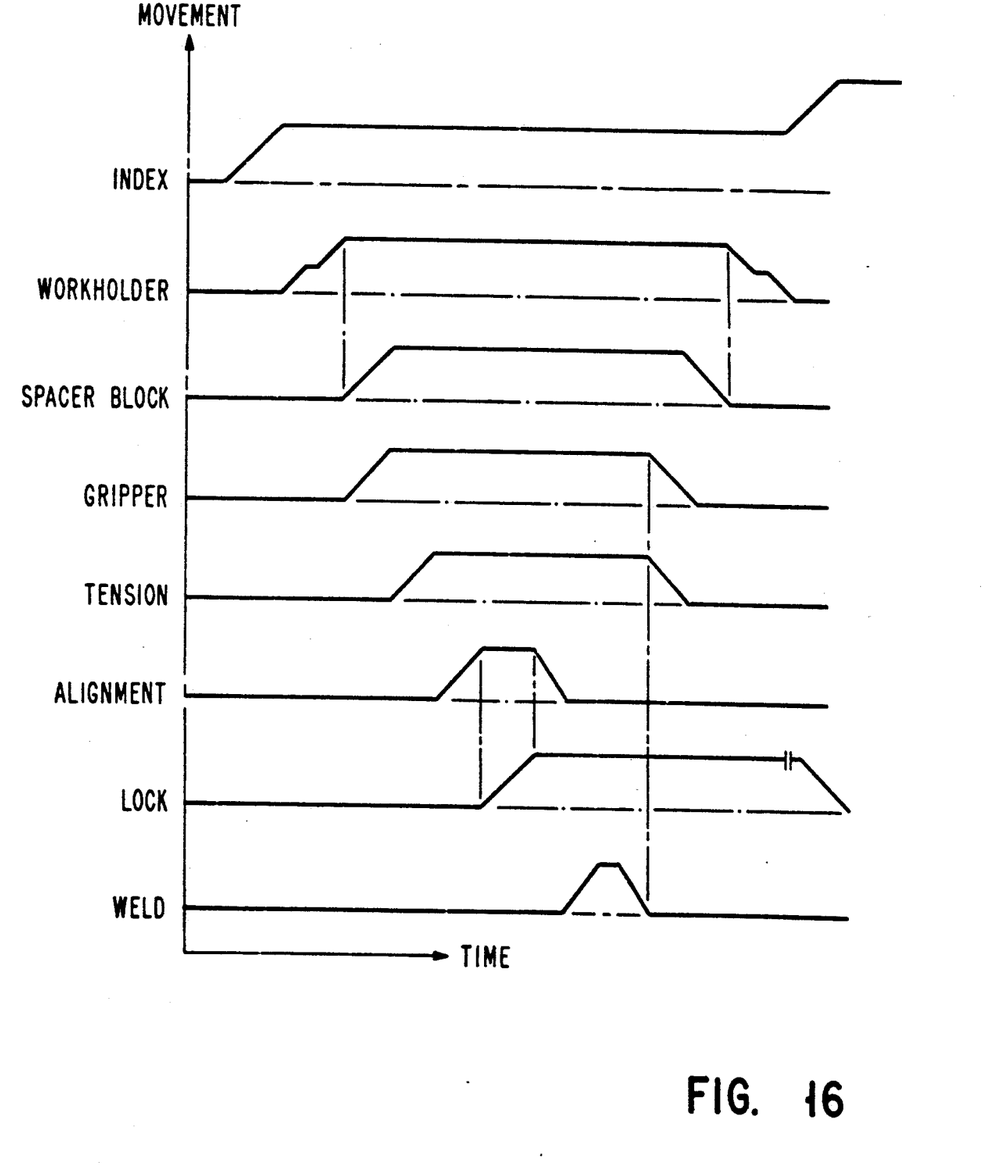
FIG. 16 is a schematic timing diagram showing a sequence of operation of various functions of the apparatus shown in FIG. 8.

FIG. 16 shows schematically simplified a representative timing sequence by which the described apparatus 70 may be operated. The referred to control console 77 (see FIG. 8) allows the operation to proceed substantially automatically, an operator being required to load the base and top frame members 30 and 31. For safety reasons, it is however desired to provide two push switch contacts 276 and 277, somewhat schematically shown in FIG. 8, which must be engaged simultaneously by the operator before the welding process can proceed. The push switches 276 and 277 are disposed at a sufficient distance with respect to each other, for the operator to require both hands on the respective push switches 276 and 277 to operate the welding equipment, thereby preventing the apparatus from accidentally injuring the operator. As shown in FIG. 16, the welding cycle begins with an indexing movement (INDEX) of the endless loop of the cars 112.

The indexing movement of the cars 112 is best described in reference to FIG. 8. In the described apparatus 70 even the incremental feed mechanism is preferably actuated by a simple and direct operation of two pneumatic cylinder assemblies 281 and 282. The cylinder assembly 281 is hingedly mounted by a pivot mount 283. An extending piston 284 carries at its outermost end a pusher tip 285. The pusher tip rests against the underside 286 of the sequence of cars 112 under the weight of the cylinder assembly 281. When the piston 284 is retracted, the pusher tip 285 merely slides over the underside of each of the cars 112. When the piston 284 becomes extended, however, the downward disposition of the piston 284 causes the pusher tip 285 to engage one of the cars and drive the coupled cars 112 in the direction of arrow 287, indexing the loop of cars. The stroke length of the cylinder assembly 281 is chosen to advance the loop of sequenced cars 112 by substantially one car or workframe. After the completion of such incremental advance of the cars 112, the cylinder assembly 282 is activated to urge a locating wedge 288 downward into engagement with the lower substantially square opening in an adjacent one of the cars 112.

The locating wedge 288 has tapered edges but is substantially of the size of such square opening in one of the car 112. Thus subsequently to each advance of the cars, the car 112 adjacent the locating wedge is always engaged and driven to the same position as the previous car 112. The sequenced operation of the two cylinder assemblies 281 and 282 as described consequently provides for a precise indexing operation on the cars 112.

Referring further to FIGS. 8 and 16, after the cars 112 have undergone the described indexing cycle, the trailing length of the strip 55 of the diaphragm material rearward of the reference position 87 remains lax, the workholder assembly 230 is in the forward load position, the horn 262 is in an upward position to provide for loading first the base frame member 30 and then the top frame member 31. The workholder assembly 230 then moves (WORKHOLDER) into the welding position with described initial inward and then upward movements of the workholder 241. The two movements are indicated with a break in the upward moving graphic representation. Thereafter the spacer block 255 (SPACER BLOCK) moves into position. Simultaneously therewith, the gripper mechanism 200 (GRIPPER) and tensions the captured length of the strip 55 in the direction perpendicular to the initial tensioning of the captured length of the strip 55. With the operative functions at the welding station 76 being complete, the diaphragm material tensioning station 73 (TENSION) is activated and moves through the described tensioning cycle.

While the strip 55 over the defined distance "D" remains under tension as described above, the front edge alignment station 72 (ALIGNMENT) is activated. First the front to rear adjustment is performed by moving the stack assembly 116 inward toward the assembly apparatus 70. Thereafter, the stack assembly 116 is moved downward to urge the tensioned strip 55 against the upper surface 142 of the adjacent car 112. The tension lock-in station 75 (LOCK) is then activated, the clamp arms 152 and 153 of the respective car 112 being closed on the aligned length of the strip 55. Thereafter, the edge alignment station 72 releases the strip 55 and the tensioning station relaxes its grip on the strip 55. It is only at this stage in the cycle that the welding operation (WELD) can be activated by the operator depressing both push switches 276 and 277. Subsequent to the welding operation as described, the gripper mechanism releases its grip on the strip 55, the workholder is retracted and moved to the load position, and the loop of cars 112 is indexed as described to begin a new welding cycle. Conditionally dependent operations are shown by vertical broken lines. It should be noted that controls which may be executed by the control console 77 includes a semi-automatic operation, in which the operation is stopped for loading the frames and for initiating the safety switches 276 and 277. The control console may in addition provide only for timed stops of the operation allowing a predetermined period for loading the frames 30 and 31, thereafter continuing automatically with the described cycle until the welding step has been reached. The assembly cycle of the apparatus 70 is completed with the release of the clamping arms 152 and 153. In reference to FIGS. 8 and 12, a camming lever 312 extends downward from the latch pawl 166. As the cars 112 are indexed past the welding station 72 and on toward the right (see FIG. 8) the camming lever of each of the pawls 166 engages a camming surface 314. The camming surface 314 urges the camming lever 312 and the corresponding pawl outward in the direction of arrow 315 in FIG. 12. The clamping arms 152 and 153 are spring loaded to an open position. Thus as soon as the pawl 166 is released, the clamping arms move to their respective open positions, and remain open until urged closed again to lock in a respective length of the tensioned strip 55 as described herein.

It should be understood that within the scope of disclosure, various changes and modifications in the structure of the described embodiment are possible without departing from the spirit and scope of the invention as described herein.

What is claimed is:

1. An animal call device comprising:
   at least two frame members stacked adjacent one another, the frame members being of elongate shape encompassing at least partially a common area, and having adjacent, mutually facing surfaces, the facing surfaces having complementarily raised and depressed surface features forming seating edges; the stacked frame members are of thermoplastic plastic material and are in the elongate shape of a horseshoe;
   at least one diaphragm having opposite major surfaces and being stretched under tension across the common area encompassed at least partially by the frame members, the diaphragm disposed between said mutually facing surfaces of the stacked frame members and being retained there between under tension at least partially by engagement of its major surfaces by the complementarily raised and depressed surface features of the mutually adjacent surfaces of the frame members; and
   interconnecting prongs of material, formed integrally with one of the stacked frame members, extending at spaced intervals through coinciding openings in the at least one diaphragm between the mutually facing surfaces of the stacked frame members and retaining the stacked frame members in fixed relationship with respect to each other, the interconnecting prongs engaging the edges of the diaphragm about the coinciding openings, thereby further retaining the diaphragm under tension by such engagement; the interconnecting prongs of material are generally cone-shaped and are adapted to be ultrasonically pierced through the at least one diaphragm into bonding engagement with the stacked frame member adjacent thereto.

2. The animal call device according to claim 1, wherein the at least one diaphragm is of a latex rubber material.

3. The animal call device according to claim 1, wherein the stacked frame members comprise at least one intermediate frame member and first and second outer frame members and the at least one diaphragm comprises at least one diaphragm disposed between adjacent surfaces of the at least one intermediate frame member and each of the first and second outer frame members.

4. The animal call device according to claim 1, wherein the material of the at least one diaphragm has a trimmed edge substantially coincident with a peripheral edge of the at least tow stacked frame members.

5. The animal call device according to claim 1, wherein the at least one diaphragm is a plurality of diaphragms retained under tension between the mutually adjacent surfaces of the frame members.

6. A method of making an animal call device comprising:
- stretching an initially unstretched first predetermined length of at least one strip of diaphragm material to a second predetermined length, thereby subjecting the at least one strip to a predetermined amount of longitudinal tension; and
- ultrasonically joining two frame members constructed of thermoplastic material, one with integral cone-shaped prongs and the other with coinciding apertures for receiving said cone-shaped prongs from opposite sides of the at least one strip into a stacked position with said cone-shaped prongs piercing and extending through the material of the at least one strip under tension to retain the tension in the material of the strip within the confines of the frame members.

7. The method of making an animal call device according to claim 6, wherein the initially unstretched predetermined first length of the at least one strip of diaphragm material is measured from a supply of such material of indeterminate length, the method comprising:
- prior to the step of joining the two frame members, clamping a portion of the at least one strip under longitudinal tension and locking in the existing longitudinal tension between spaced locations of a workframe.

8. The method according to claim 7, further comprising:
- prior to the step of joining, stretching the locked in portion of the at least one strip in a direction at right angles to the direction of the longitudinal tension of the strip, thereby generating a transverse tension in addition to the locked in longitudinal tension in the at least one strip.

9. The method according to claim 7, further comprising after clamping and locking in the existing longitudinal tension in the strip, releasing the tension from the longitudinally tensioned strip not clamped and then executing the step of joining the two frame members.

10. The method according to claim 6, wherein the frame members are ultrasonically welded to each other, and wherein the step of ultrasonically welding the frame members to each other comprises retaining the diaphragm material under tension with the material joining the frames and with contoured surfaces of the frames on the opposite sides of the at least one strip of the diaphragm material.

11. The method according to claim 6, wherein joining two frame members comprises the step of ultrasonically vibrating at least one of the frame members with respect to the other such that the frame members retain the at least one strip of diaphragm material and the tension therein.

12. The method according to claim 11, wherein prior to the steps comprising joining the two frame members, the method further comprises capturing the longitudinal tension in a portion of the second predetermined length of the at least one strip of diaphragm material, and subjecting the portion of the strip with the captured longitudinal tension to a transverse tension; and then proceeding by joining the two frame members through the portion of the strip subjected to both the longitudinal and the transverse tension.

13. The method according to claim 12, wherein the at least one strip of diaphragm material is a plurality of strips and each of the strips of diaphragm material and the tension therein is retained by joints between the frame members.

* * * * *

UNITED STATES PATENT AND TRADEMARK OFFICE
CERTIFICATE OF CORRECTION

PATENT NO. : 5,234,369

DATED : August 10, 1993

INVENTOR(S) : David R. Forbes, et al

It is certified that error appears in the above-identified patent and that said Letters Patent is hereby corrected as shown below:

In column 5, line 19: after "aluminum frame", insert --11,--.

In column 8, line 12: delete "Ways" and insert --ways-- therefor.

Move the block of language beginning with "frame" in column 11, line 26 and continuing through and including "Though" in column 11, line 67 by deleting same from column 11 and inserting same after "base" and before "particular" in column 7, line 49.

In column 13, line 6: delete "Or" and insert --or--therefor; and line 7: delete "oars" and insert --cars-- therefor; and delete "looks" and insert --locks-- therefor.

In column 15, line 7: delete "space" and insert --spacer-- therefor.

In column 16, line 23: delete "20" and insert --203-- therefor.

UNITED STATES PATENT AND TRADEMARK OFFICE
CERTIFICATE OF CORRECTION

PATENT NO.   : 5,234,369
DATED        : August 10, 1993
INVENTOR(S)  : David R. Forbes, et al It is certified that error appears in the above-indentified patent and that said Letters Patent is hereby corrected as shown below:

Column 18, line 64, delete "tow" and insert --two--

Signed and Sealed this

Twenty-second Day of March, 1994

Attest:

BRUCE LEHMAN

*Attesting Officer*     *Commissioner of Patents and Trademarks*